(12) United States Patent
Guy, Jr.

(10) Patent No.: US 6,362,727 B1
(45) Date of Patent: Mar. 26, 2002

(54) RETROFIT SNOWPLOW LIGHTING

(76) Inventor: John W. Guy, Jr., 26876 Tunis Mills Rd., Easton, MD (US) 21601

( * ) Notice: Subject to any disclaimer, the term of this patent is extended or adjusted under 35 U.S.C. 154(b) by 0 days.

(21) Appl. No.: 09/657,790

(22) Filed: Sep. 8, 2000

Related U.S. Application Data

(60) Provisional application No. 60/152,797, filed on Sep. 8, 1999.

(51) Int. Cl.$^7$ ................................................ B60Q 1/00
(52) U.S. Cl. ................ 340/425.5; 340/438; 340/815.4; 37/231
(58) Field of Search ............................ 340/425.5, 438, 340/815.4, 815.49; 37/231, 232, 268; 307/10.1, 10.8

(56) References Cited

U.S. PATENT DOCUMENTS

| | | | | |
|---|---|---|---|---|
| D260,937 S | * | 9/1981 | Hetrick | .................. D26/35 |
| 4,728,775 A | * | 3/1988 | Van Straten | ................ 219/202 |
| 5,930,922 A | * | 8/1999 | Altheide | ...................... 37/268 |
| 6,005,300 A | * | 12/1999 | Kelly | ....................... 307/10.1 |
| 6,138,388 A | * | 10/2000 | Kost et al. | .................... 37/231 |

* cited by examiner

*Primary Examiner*—Van T Trieu
(74) *Attorney, Agent, or Firm*—Law Offices of Royal W. Craig

(57) ABSTRACT

A lighting apparatus for a snowplow comprises a plurality of lamps fixed to the top portion of a snowplow. Holes are applied to structural members of the snowplow moldboard, and fasteners and protectors are employed to fixedly attach electrical connections through the holes. Fasteners such as eye bolts are used to fixedly attach the electrical connections that run from the snowplow blade, through the snowplow frame, and into the engine compartment. The resultant lighting system illuminates the area in front of the snowplow for better operation.

2 Claims, 5 Drawing Sheets

RETROFIT SNOWPLOW LIGHTING

CROSS-REFERENCE TO RELATED APPLICATIONS

The present application is based on provisional application No. 60/152,797 for "RETROFIT SNOWPLOW LIGHTING"; Filed: Sep. 8, 1999.

BACKGROUND OF THE INVENTION

1. Field of the Invention

The present invention relates to an improved lighting apparatus, and in particular, to an apparatus and method for retrofitting a snowplow with lighting to warn other motorists of the presence and location of the snowplow.

2. Description of the Background

For snow removal from public roads, public and municipal agencies typically fit a snowplow on road repair, sanitation, and other public works vehicles, which are large diesel vehicles with wide plows and tall lights. They are heavy and have long stopping distances, especially in poor driving conditions. When they are plowing, it is highly undesirable to stop or swerve to avoid a road hazard, because plowing requires steady and straight progress to effectively move snow off of the road surface.

Motorists are using the roads during snowfall conditions with increasing frequency. Motorists are also increasingly using vehicles that lend a largely false sense of safety and invulnerability in poor driving conditions, such as four-wheel drive and all-wheel drive vehicles. Snow plow operators must increasingly contend with drivers that move past too closely and too quickly for safety. It is therefore highly desirable to make motorists aware of the presence and position of a snowplow mounted on the front of a public works vehicle.

In contrast, the vast majority of vehicles used to plow snow for profit are pickup trucks and utility vehicles. They are often vehicles engaged in the landscaping business in the warmer months. These vehicles are not as tall as public works vehicles and warning illumination, if present, is often blocked or partially blocked by the snowplow. This snowplow user must be able to move from job to job on the roads, typically at nighttime or other poor visibility conditions. Warning illumination would therefore also be of great advantage to the person plowing driveways and lots for profit, especially in climates where the winter night is very long.

A key benefit of a retrofit kit for snowplow lighting is that the snowplow user may acquire the lighting kits after they have evaluated the need for lighting, or after they have established business to pay for the lighting kit. A retrofitted light kit of the proper design would be simple to remove to repair and replace components, and would serve the market for existing snowplow owners. Snow throwers for residential use, which are gasoline powered and use an impeller or pair of impellers to remove snow hydraulically instead of by way of a plow, are well known in the prior art, and sometimes employ lighting apparatus to facilitate plowing at night. Such retrofitted light kits are for the purpose of allowing the user to see in night operation, and for the purpose of warning others.

SUMMARY OF THE INVENTION

It is therefore an object of the present invention to provide a retrofit snowplow lighting system for incorporation onto a new or existing snowplow, which warns others of the presence and location of the snowplow apparatus.

It is a further object of the present invention to provide a method for conveniently applying a lighting apparatus to an existing snowplow that is versatile so as to permit installation on a wide variety of commercially available snowplow units, and is economical and facile in manufacture.

These and other related objects are accomplished by providing a plurality of lamps fixed to the side portion of a snowplow, near the top of the moldboard or near the top of the frame. Holes are applied to structural members of the moldboard, and fasteners and protectors are employed to fixedly attach electrical connections through the holes. Fasteners such as eye bolts are used to fixedly attach the electrical connections that run from the moldboard, through the snowplow frame, and into the engine compartment. A detachable electrical connection allows the lighting apparatus to be connected to the vehicle electrical system when in use, and detached when the snowplow attachment is removed. Further connections allow the moldboard to be disconnected from the snowplow frame without disrupting the illumination kit.

BRIEF DESCRIPTION OF THE DRAWINGS

Other objects, features, and advantages of the present invention will become more apparent from the following detailed description of the preferred embodiment and certain modifications thereof when taken together with the accompanying drawings in which.

Other objects, features, and advantages of the present invention will become more apparent from the following detailed description of the preferred embodiment and certain modifications thereof when taken together with the accompanying drawings in which.

DETAILED DESCRIPTION OF THE PREFERRED EMBODIMENTS

Figure 1:
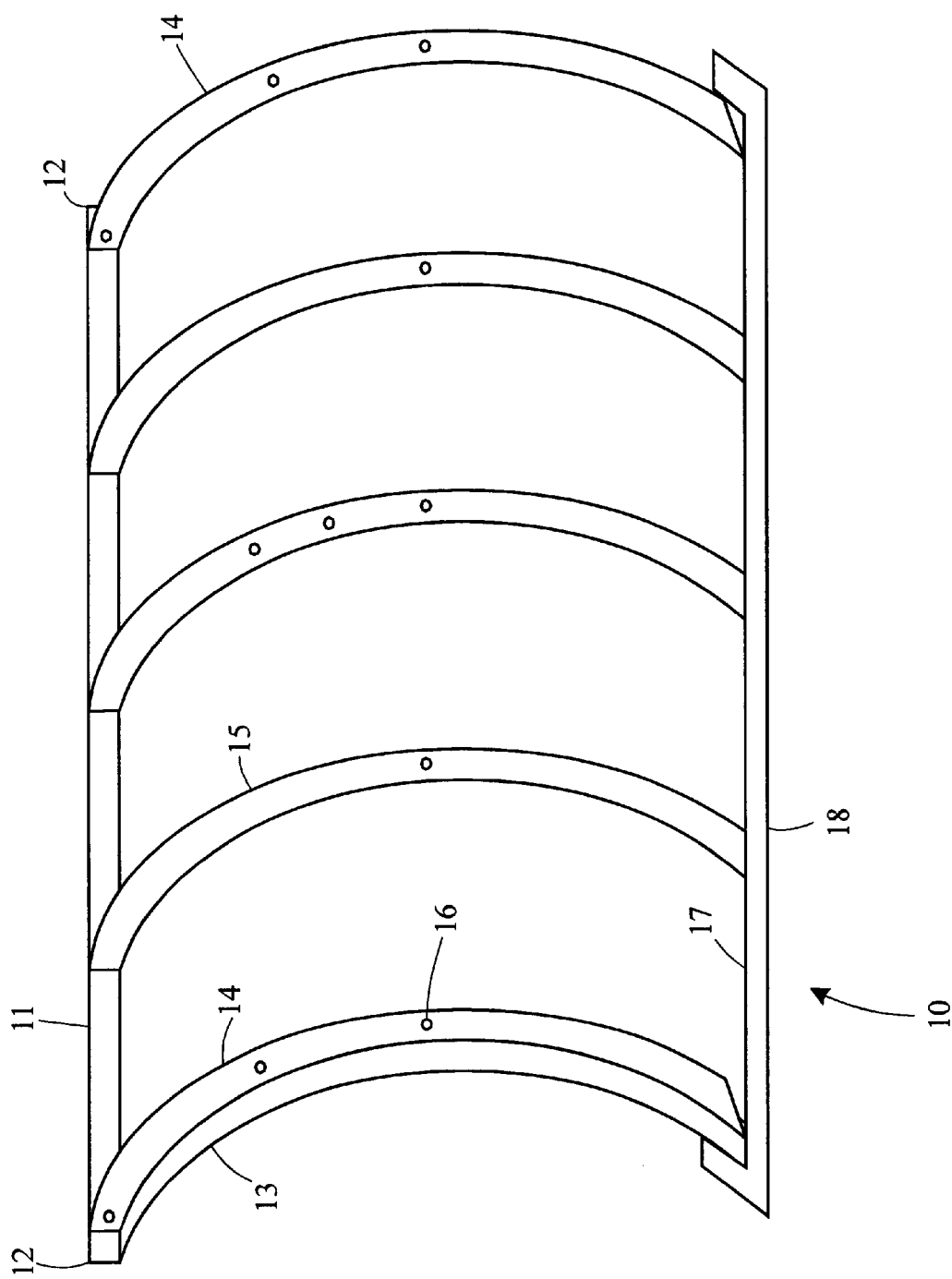
FIG. 1 is an oblique view drawing of an exemplary snowplow moldboard 10 configured to accept a snowplow lighting apparatus according to a preferred embodiment of the present invention.

Referring now to FIG. 1, an exemplary snowplow moldboard 10 is formed from an cylindrically arcuate plate of rigid material, such as steel or aluminum. It is reinforced structurally by a top member 11 to prevent warping, and a plurality of web members 15 to prevent bending, and to provide a surface to which attachment of the plow to a frame (not shown) is made. End web members 14 are positioned near the side edge portions 13 of moldboard 10. The bottom edge 17 of the moldboard 10 is fitted with a blade 18, typically a replaceable length of metal or plastic that is worn by the application of the snowplow to the road. In the preferred embodiment of the present invention, a combination of top member 11, web members 15, and end web members 14 are fitted with holes 16 for the removable attachment of electrical connections (not shown). The holes 16 are preferably applied by drilling or reaming, but may be applied by any well known and commercially available process.

Top member 11, end web member 14, and side edge portion 13 combine to form a top end portion 12 in the exemplary moldboard 10 which is the preferred location of a lighting appliance. The lighting fixture and associated hardware and electrical connection are well protected from damage and the elements in this location. The top end portion 12 also represents the extreme edge of the hazard to passing motorists.

Figure 2:
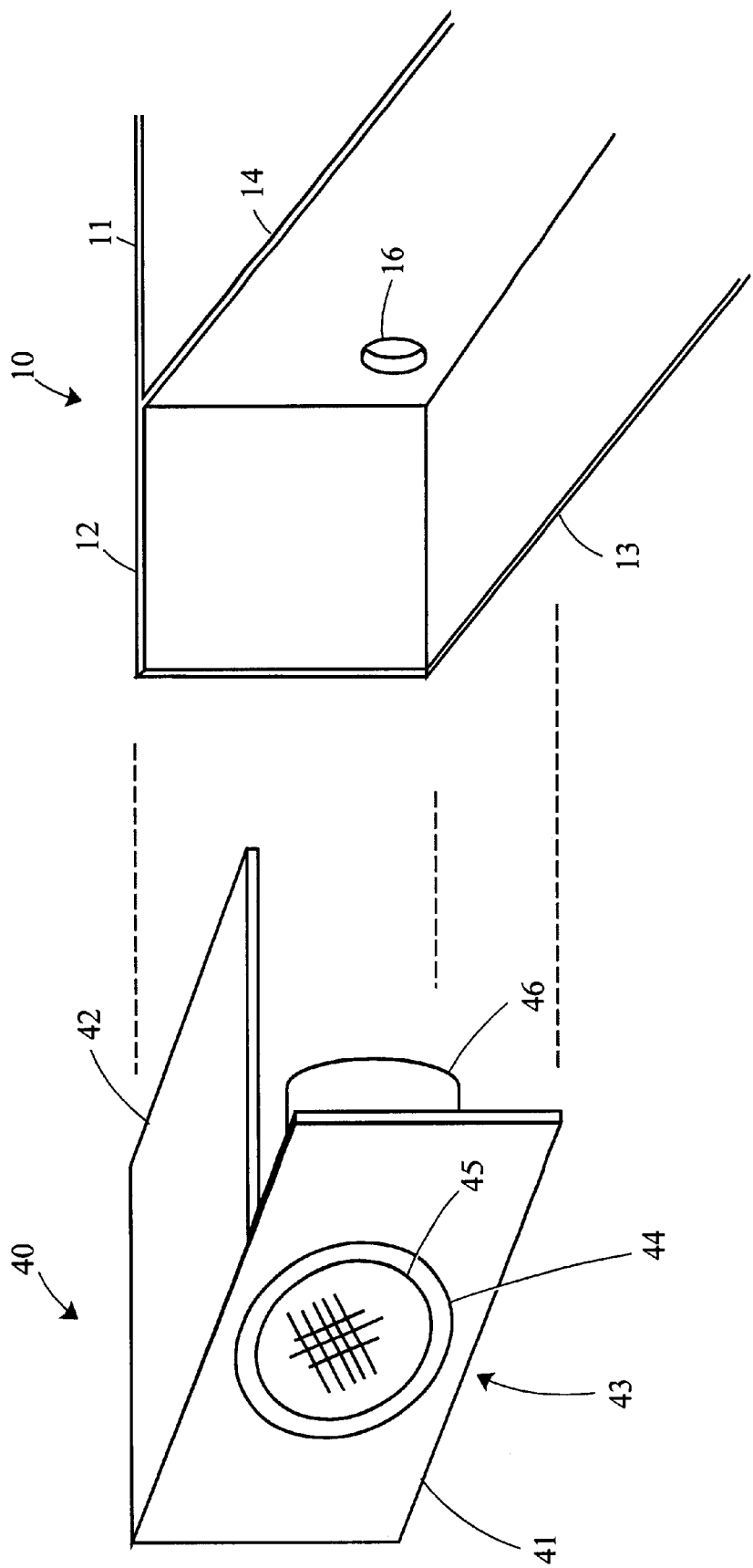
FIG. 2 is an oblique view drawing of the top side portion 12 of the moldboard 10 of FIG. 1, and an exemplary snowplow lighting fixture 40.

FIG. 2 more closely shows an exemplary top end portion 12 of moldboard 10. A moldboard lighting appliance 40 comprises a moldboard lighting bracket 41 and flange 42 which are made of two pieces of ordinary steel welded by any commonly available process, and contains an aperture for a light fixture 43. An exemplary light fixture 43 is manufactured by the Trucklite company of Jamestown, N.Y. It comprises a circular pliant fitting 44 that holds a circular lens 45, in a circular aperture of standard size. A housing 46 protects the hardware of the light. It is readily apparent to one of ordinary skill in the relevant art that light fixture 43 can be of any commercially available type, and need not be circular in aspect.

In the preferred embodiment, the lighting appliance 40 is spot welded to the margins of top end portion 12 of moldboard 10, but may be attached my any other well known and commercially available means. Lighting bracket 41 and flange 42 need not be made of steel but may be formed of any damage- and weather-resistant material.

Figure 3:
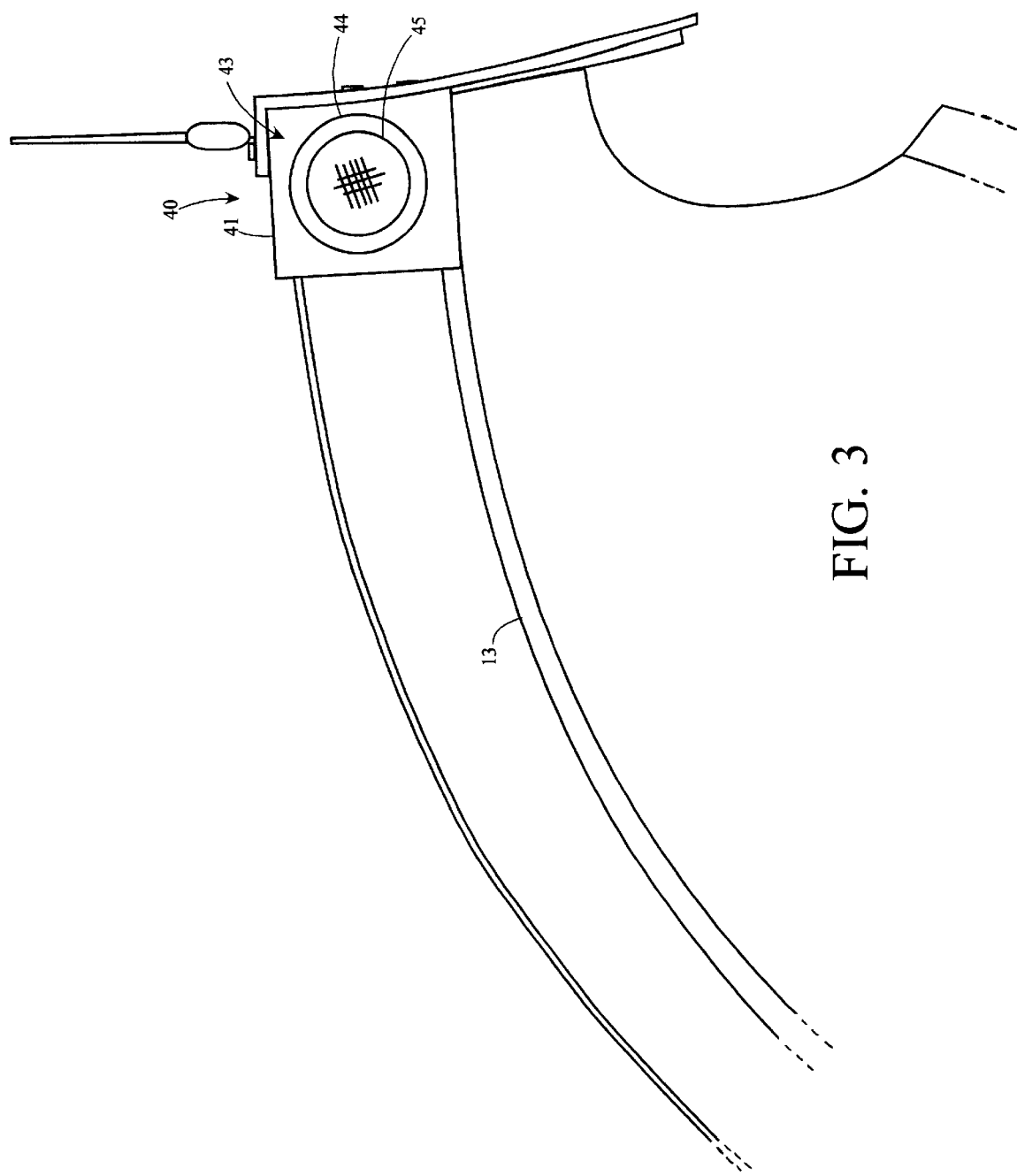
FIG. 3 is a side view photograph of a snowplow moldboard 10 showing a snowplow lighting fixture 40 fitted according to a preferred embodiment of the present invention.
Figure 4:
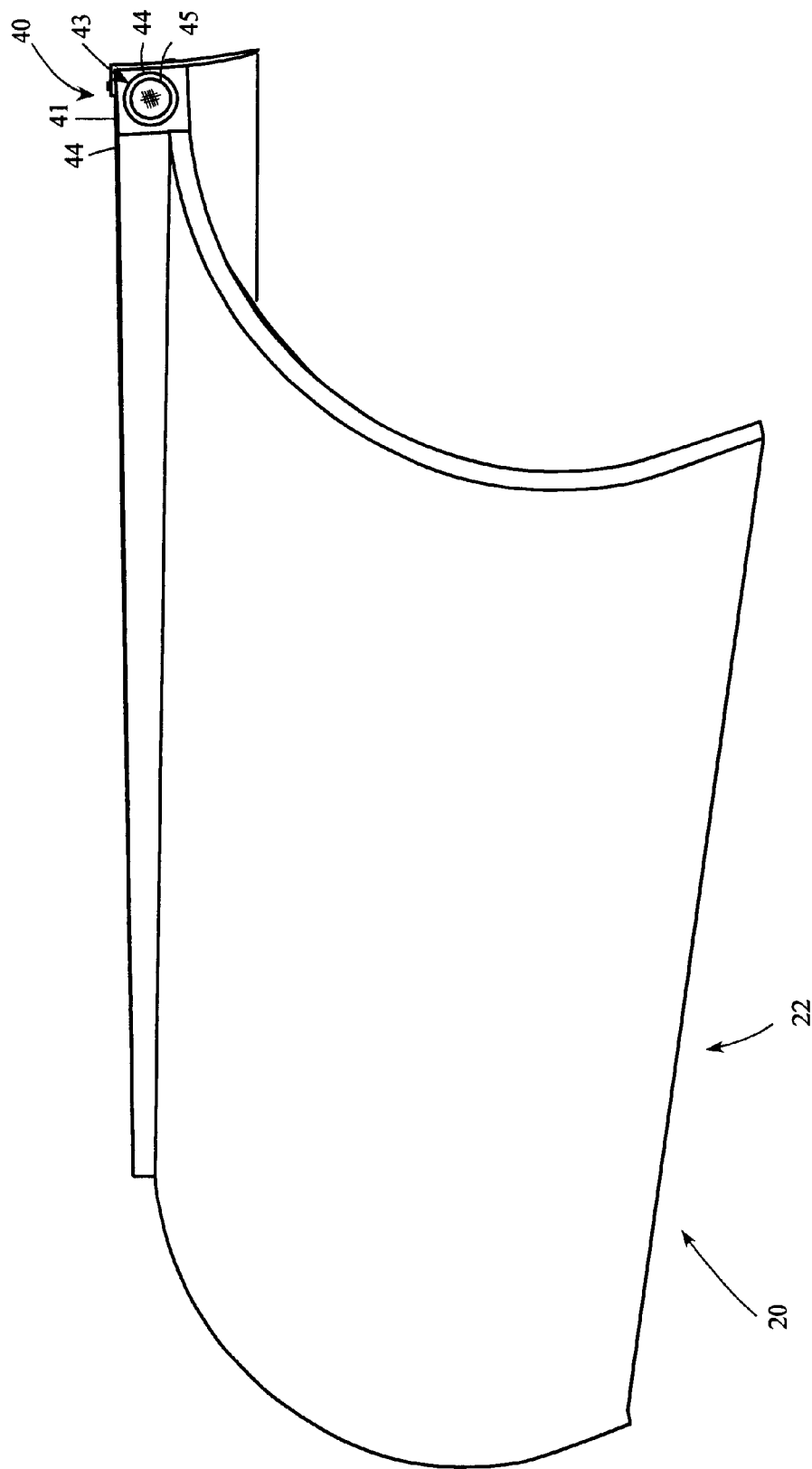
FIG. 4 is an oblique view photograph of the snowplow moldboard 10 of FIG. 3 and snowplow frame 20 showing two snowplow light fixtures fitted in a moldboard light bracket and a frame light bracket, respectively.

FIG. 3 and FIG. 4 portray fully assembled lighting fixtures attached to the preferred locations of a snowplow adapted for use on a public works vehicle. Snowplow frame 20 generally comprises canting means 22 for adjusting the angle of attack of the plow when plowing, for the purpose of pushing the snow in the desired direction, and raising means 24 for raising and lowering the moldboard 10 and blade 18 with respect to the road surface. In FIG. 3, a warning light fixture 43 is shown attached to top end portion 12 of moldboard 10. FIG. 4 further portrays a second light fixture 43 is mounted at the top of the raising means 24 of snowplow frame 20.

Figure 5:
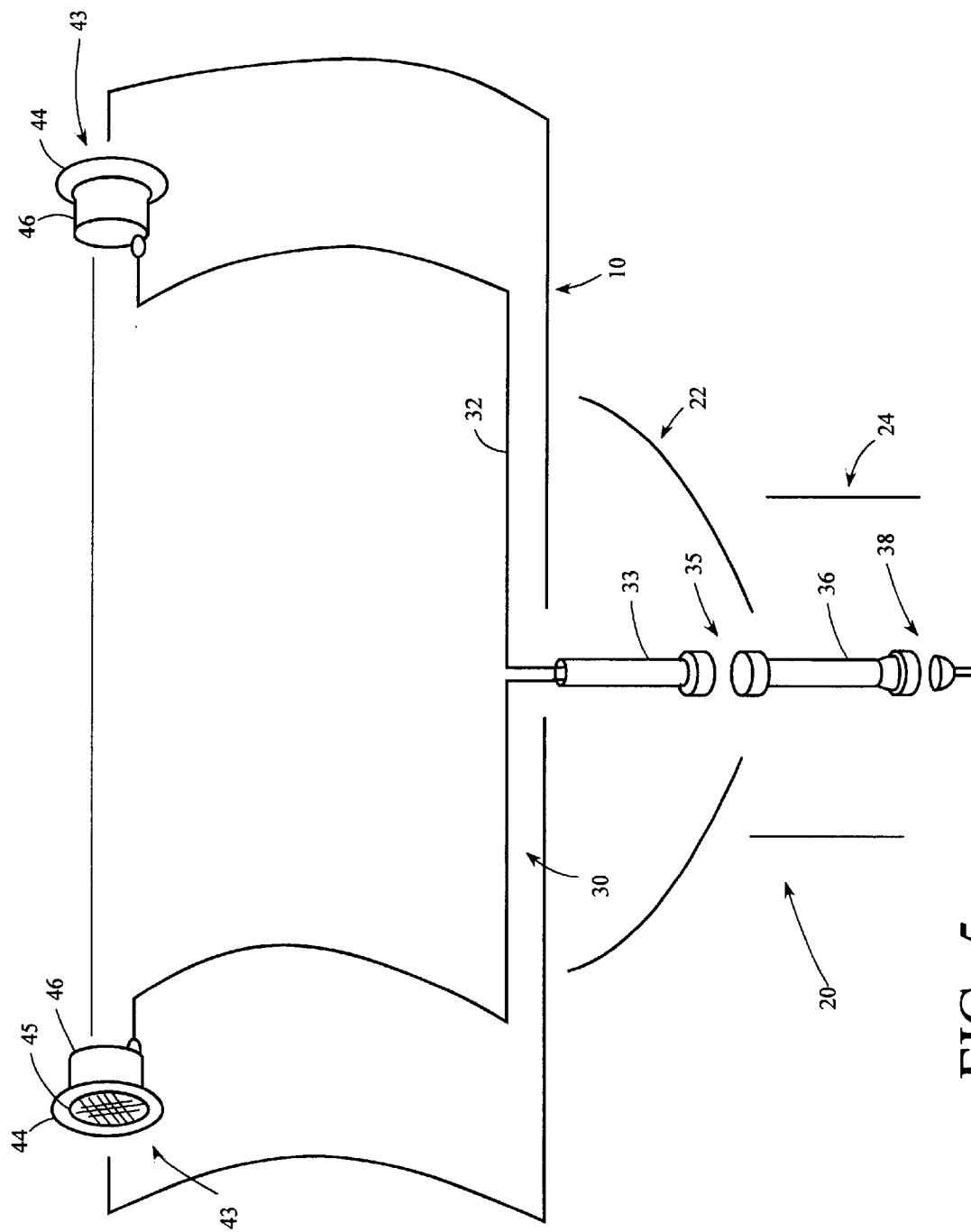
FIG. 5 is a diagram of an exemplary wiring apparatus for providing electrical power to a pair of moldboard light fixtures.

Referring now to FIG. 5, an exemplary snowplow frame 20 has canting means 22 which forms a transverse angle, and also comprises raising means 24. In some exemplary snowplow frames 20, canting means 22 and raising means 24 are hydraulically powered and utilize a control system that can be operated by the driver from the driver position of the vehicle. It would be readily apparent to one of ordinary skill in the relevant art that the lighting apparatus of the present invention may also incorporate activation means that may be operated from the driver position. However, in the preferred embodiment, activation is in the same manner that the headlights of the vehicle, or existing running or warning lights, are activated.

Snowplow frame 20 has fasteners (not shown) for receiving the above described electrical connections (not shown). In the present embodiment, fasteners are threaded eye bolts connected to the snowplow frame 20 by threaded nuts, but may be applied by any well known and commercially available process.

Further regarding FIG. 5, a snowplow lighting apparatus 30 comprises a plurality of lighting fixtures 43 which are each connected to a plurality of first electrical connections 32 of the type described herein. These first electrical connections 32 are connected by way of terminations 35 to a supply connection 36. Supply connection 36 is also an electrical connection of the type described herein. Second termination 38 of supply connection 36 is connected to the power system of the snowplow vehicle. In the preferred embodiment, first terminations 35 are of a resilient plastic clip type, but may be of any well known durable and weather-resistant type. Second termination 38 is of a metal type commonly found to supply electrical power to a towed trailer, but may also be of any durable and weather-resistant type. The electrical connections 32, 33, and 36 are sized to be routed in protected areas of moldboard 10 past points where attachments can be made through and adjacent to apertures 16. The electrical supply apparatus 30 is in segments to permit the portions of the snowplow apparatus to be disassembled for repair and maintenance.

In the present embodiment, the electrical connections are formed from well known and commercially available 14-gauge electrical wire, shrouded by a wire loom conduit to protect the electrical circuit from damage. It is readily apprehended by one of ordinary skill in the relevant art that any well known and commercially available means of supplying electrical power to the light appliances, and means for protecting the electrical connections from damage and wear, may be used.

Having now fully set forth the preferred embodiment and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth in the appended claims.

I claim:

1. A method of affixing lighting to a snowplow vehicle comprising the steps of:

(a) forming a first electrical connection having a first termination to the electrical system of the snowplow vehicle by way of a second termination, (b) fixedly attaching a plurality of light appliances to distal ends of a top portion of a snowplow blade, (c) forming second electrical connections from each lighting appliance to said first termination, and (d) securing said first and second electrical connections to secure points of the snowplow blade and a snowplow frame;

wherein said lighting appliances are directed to warn and inform motorists of the presence and position of a snowplow.

2. The product made by the process of claim 1.

* * * * *